(12) United States Patent
Lin et al.

(10) Patent No.: US 6,244,175 B1
(45) Date of Patent: Jun. 12, 2001

(54) SINGLE SPACE ROTARY PRINTING PRESS FOR NEWSPAPERS

(75) Inventors: Chung Hsien Lin; Ting Chen Yu, both of Taipei (TW)

(73) Assignee: Hueiloo Co., Ltd., Taipei (TW)

( * ) Notice: Subject to any disclaimer, the term of this patent is extended or adjusted under 35 U.S.C. 154(b) by 0 days.

(21) Appl. No.: 09/534,623

(22) Filed: Mar. 27, 2000

(51) Int. Cl.$^7$ ..................................................... B41F 5/00
(52) U.S. Cl. .......................... 101/216; 101/181; 74/410; 74/420; 74/665 GC
(58) Field of Search ................................. 101/216, 181, 101/183, 174; 74/665 GC, 665 GB, 410, 420

(56) References Cited

U.S. PATENT DOCUMENTS

| | | | |
|---|---|---|---|
| 4,311,435 | * | 1/1982 | Bergero ................................. 416/170 |
| 5,634,374 | * | 6/1997 | Depietri ................................. 74/420 |
| 5,771,804 | * | 6/1998 | Knauer et al. ........................ 101/183 |
| 5,865,120 | * | 2/1999 | Gross .................................... 101/483 |
| 6,041,670 | * | 3/2000 | Basstein ................................ 74/416 |

* cited by examiner

Primary Examiner—John S. Hilten
Assistant Examiner—Kevin Williams
(74) Attorney, Agent, or Firm—Rosenberg, Klein & Lee

(57) ABSTRACT

A single space rotary printing press for newspapers includes a plurality of printing units arranged at different elevations, the printing units each having a plate cylinder with an annular gear at one end, a first transmission gear box and at least one second transmission gear box driven to rotate the printing units, the first transmission gear box having a power input shaft for receiving external rotary driving force and a power output shaft for transmitting external rotary driving force to one printing unit, the at least one second transmission gear box each having a power input shaft for receiving external rotary driving force, a power output shaft for transmitting external rotary driving force to one printing unit, and a transmission shaft for transmitting external rotary driving force to the power input shaft, and an adjustment mechanism coupled between the transmission shaft and the power input shaft for adjusting the position of the plate cylinder of the corresponding printing unit, and coupling means for transmitting rotary driving force from the power output shaft of the first transmission gear box to the transmission shaft of each second transmission gar box.

2 Claims, 13 Drawing Sheets

SINGLE SPACE ROTARY PRINTING PRESS FOR NEWSPAPERS

BACKGROUND OF THE INVENTION

The present invention relates to a single space rotary printing press for newspapers, and more particularly to such a single space rotary printing press, which has a precision rotary driving force transmission system, and means for adjusting the position of the plate cylinder of each printing unit.

A regular single space rotary printing press is generally comprised of a plurality of printing units arranged at different elevations, belt transmission means respectively coupled between each two adjacent printing units, and a main motor controlled to rotate the printing units through the belt transmission means. The printing units are controlled to print a respective particular color on paper. When a new roll of paper is installed, the position of the plate cylinder of each printing unit should be respectively adjusted subject to the tension of paper used. The plate cylinder position adjusting procedure is achieved manually. This structure of single space rotary printing press has drawbacks. One drawback of this structure of single space rotary printing press is that the transmission belt of the transmission mechanism between each two printing units wears quickly with use. When the transmission belt of the transmission mechanism between two adjacent printing units starts to wear, the printing units cannot be rotated at same speed, causing the printing units unable to print the printing on paper precisely. Further, because the single space rotary printing press has a certain height about equal to the elevation of a three-floor building, it is dangerous and time-consuming to adjust the position of the plate cylinder of each printing unit manually, and difficult to precisely adjust the plate cylinder of each printing unit to the accurate position.

SUMMARY OF THE INVENTION

The present invention has been accomplished to provide a single space rotary printing press for newspapers, which eliminates the aforesaid drawbacks. It is one object of the present invention to provide a single space rotary printing press for newspapers, which uses transmission gearbox to achieve rotary driving force transmission from one printing unit to another. It is another object of the present invention to provide a single space rotary printing press for newspapers, which comprises fine adjustment means for adjusting the position of the plate cylinder of each printing unit precisely by means of the control of a computer. To achieve these and other objects of the present invention, there is provided a single space rotary printing press for newspapers, which comprises a plurality of printing units arranged at different elevations, the printing units each having a plate cylinder with an annular gear at one end, a first transmission gear box and at least one second transmission gear box driven to rotate the printing units, the first transmission gear box having a power input shaft for receiving external rotary driving force and a power output shaft for transmitting external rotary driving force to one printing unit, the at least one second transmission gear box each having a power input shaft for receiving external rotary driving force, a power output shaft for transmitting external rotary driving force to one printing unit, and a transmission shaft for transmitting external rotary driving force to the power input shaft, and an adjustment mechanism coupled between the transmission shaft and the power input shaft for adjusting the position of the plate cylinder of the corresponding printing unit, and coupling means for transmitting rotary driving force from the power output shaft of the first transmission gear box to the transmission shaft of each second transmission gar box.

DETAILED DESCRIPTION OF THE PREFERRED EMBODIMENT

Figure 9:
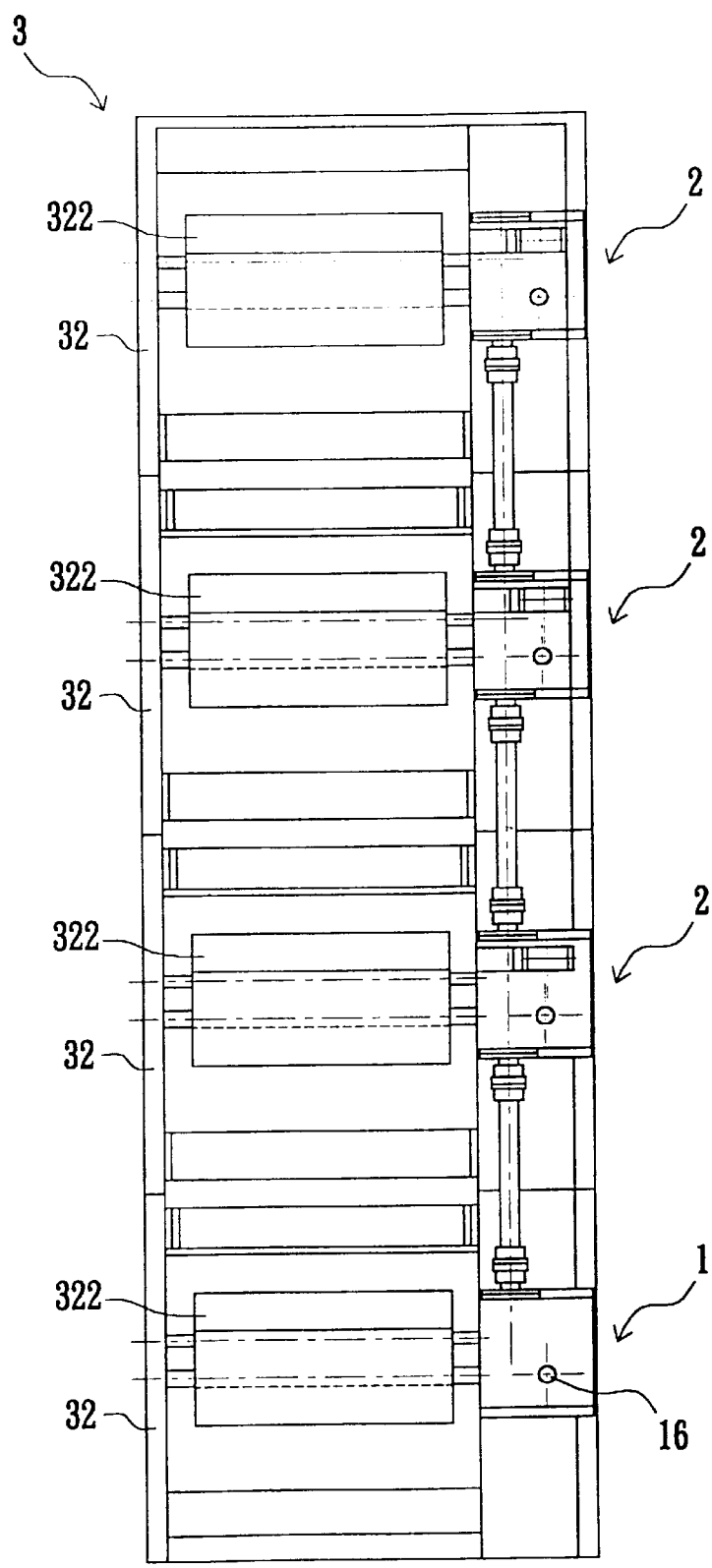
FIG. 9 is a top plain view of the present invention, showing the first transmission gearbox and second transmission gearboxes respectively coupled to the printing units.

Referring to FIG. 9, a single space rotary printing press for newspapers is shown comprising a first transmission gear box 1, and a plurality of second transmission gear box 2.

Figure 1:
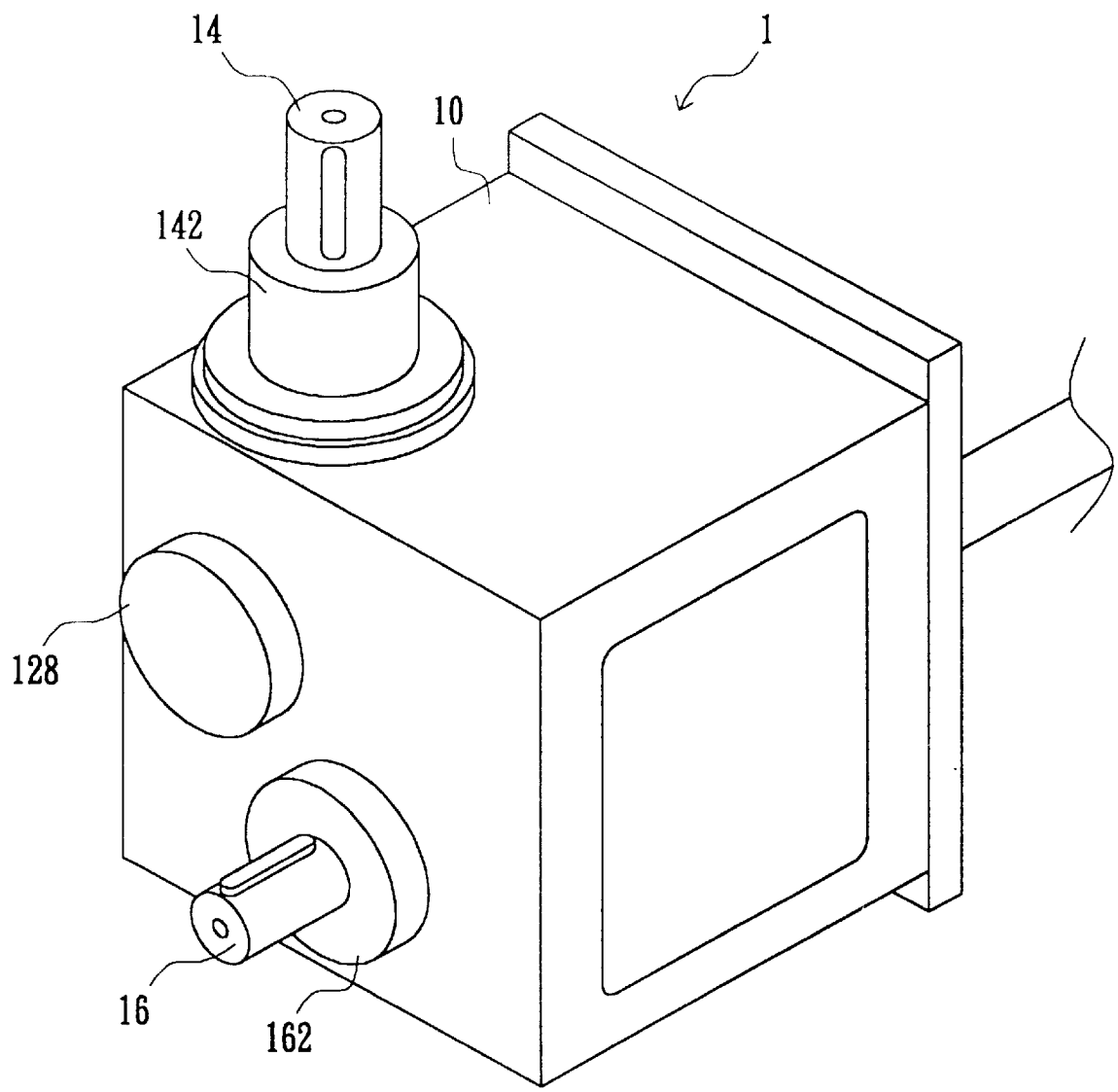
FIG. 1 is an elevational view of a first transmission gearbox for a single space rotary printing press according to the present invention.
Figure 2:
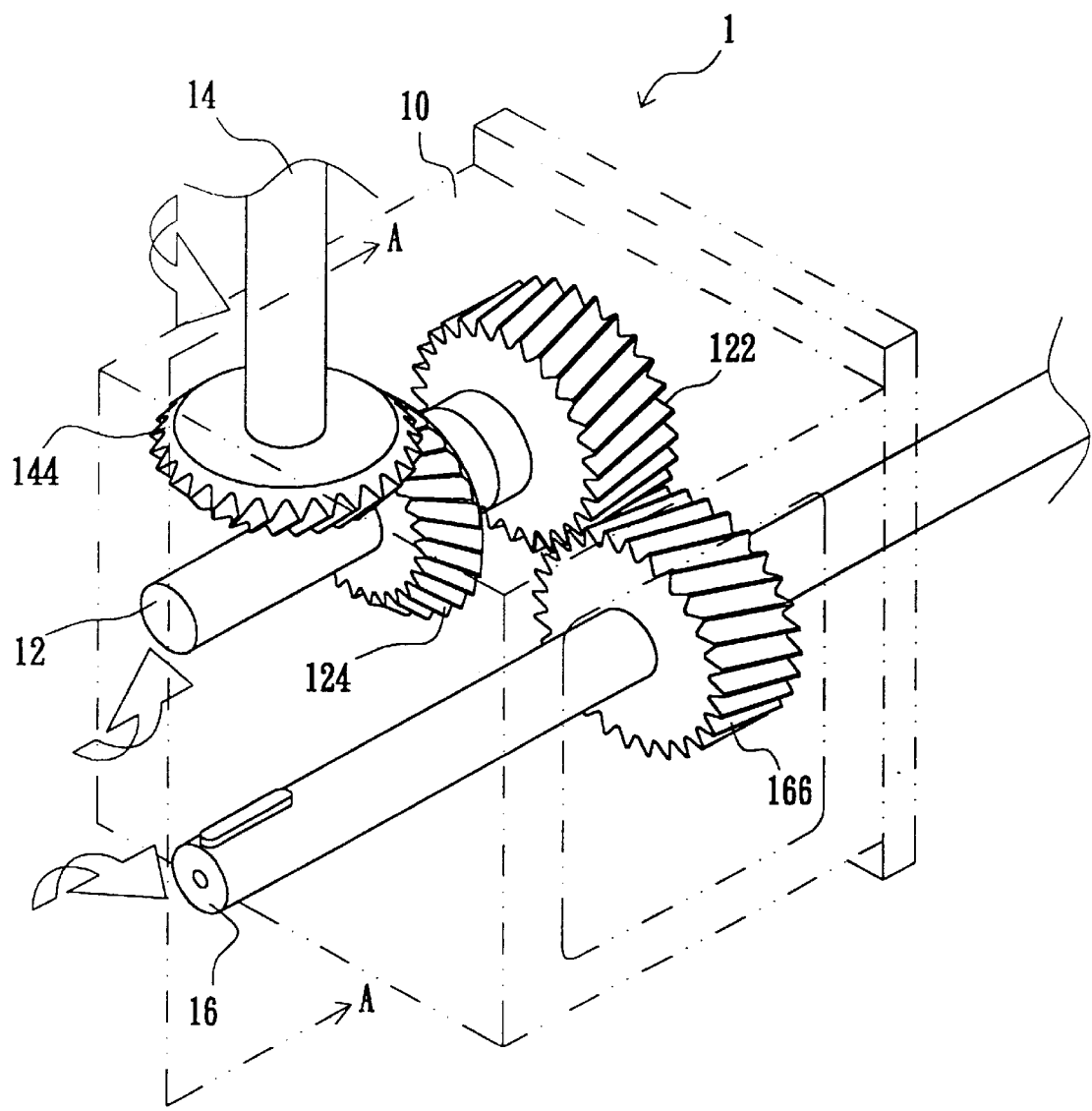
FIG. 2 illustrates the internal structure of the first transmission gearbox according to the present invention.
Figure 2A:
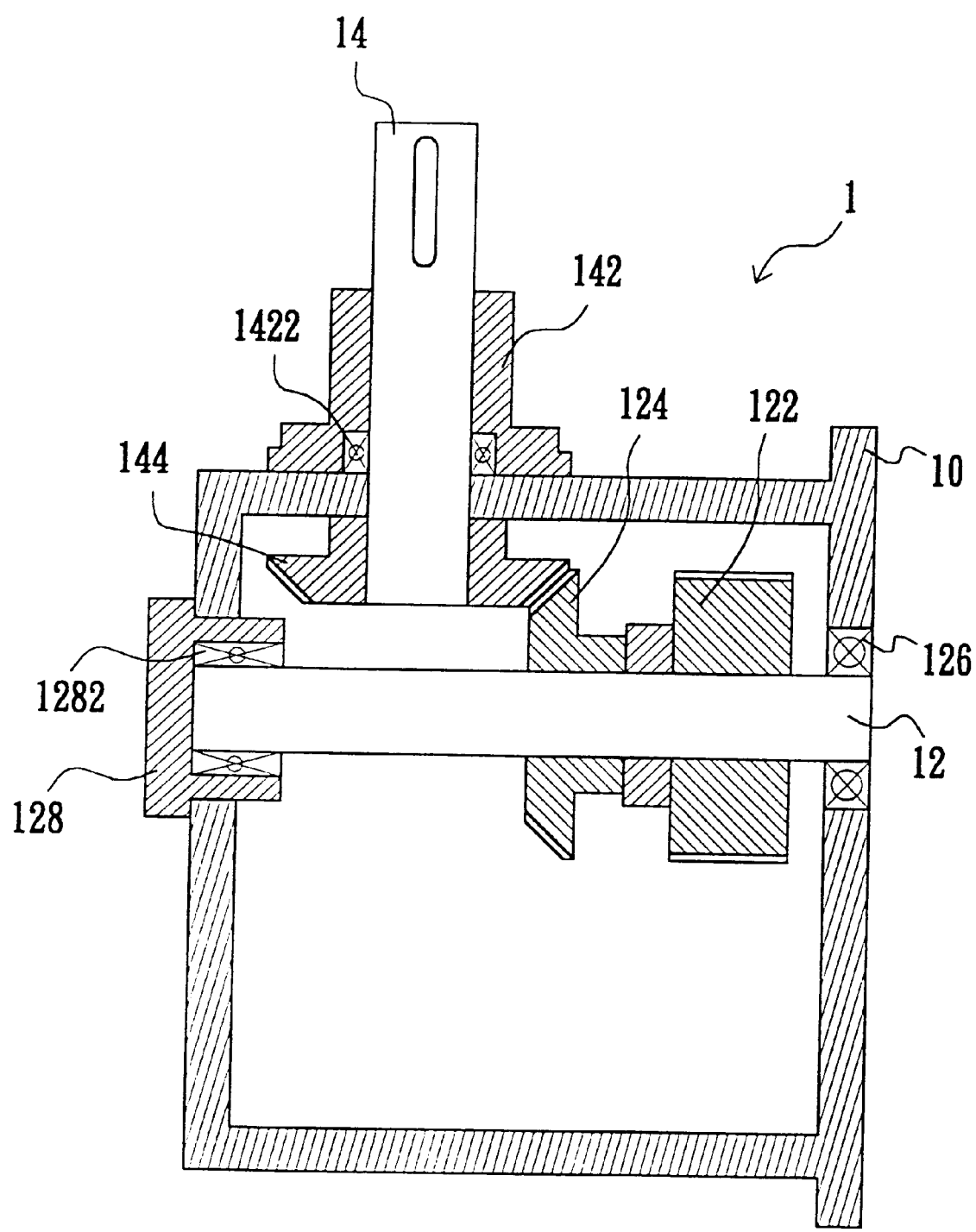
FIG. 2A is a sectional view taken along line A—A of FIG. 2.
Figure 3:
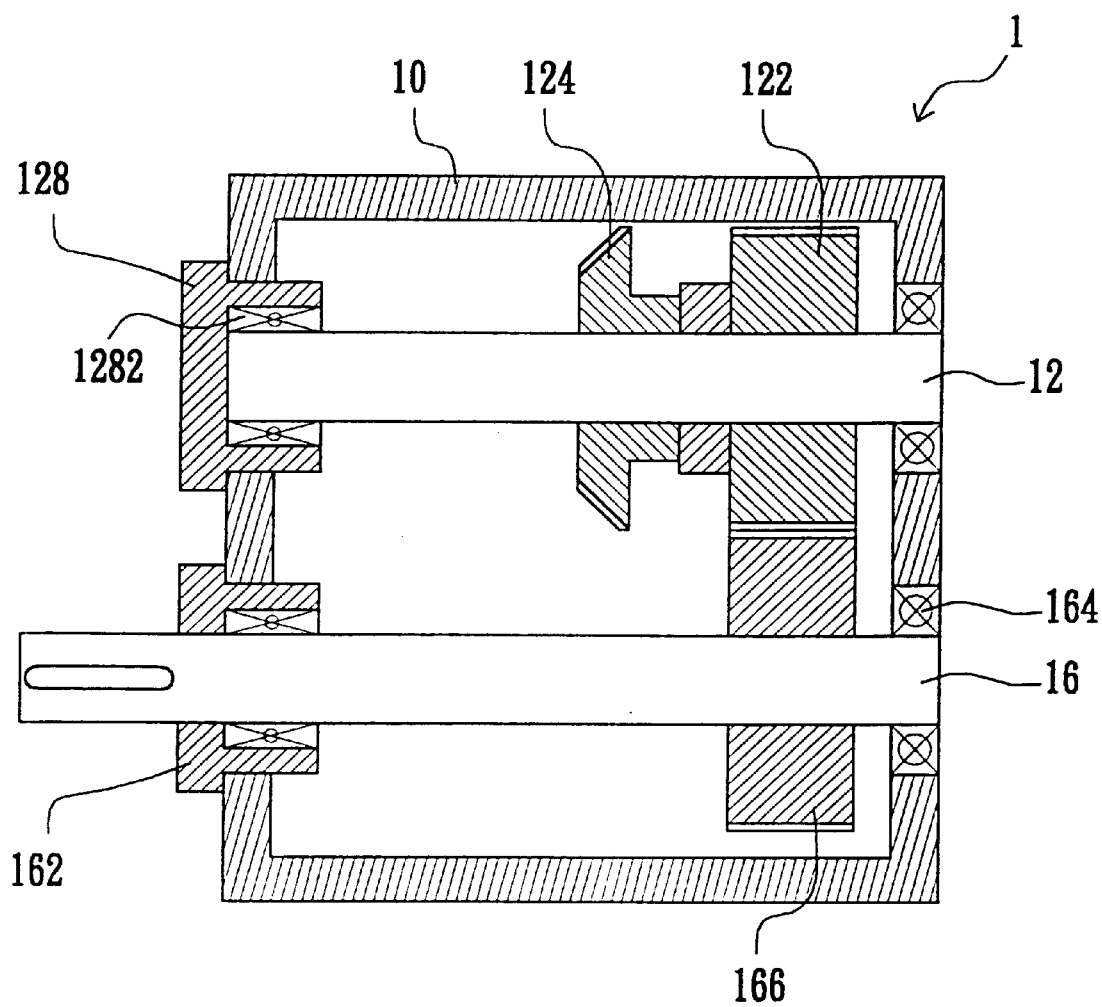
FIG. 3 is a top view in section of the first transmission gearbox according to the present invention.
Figure 4:
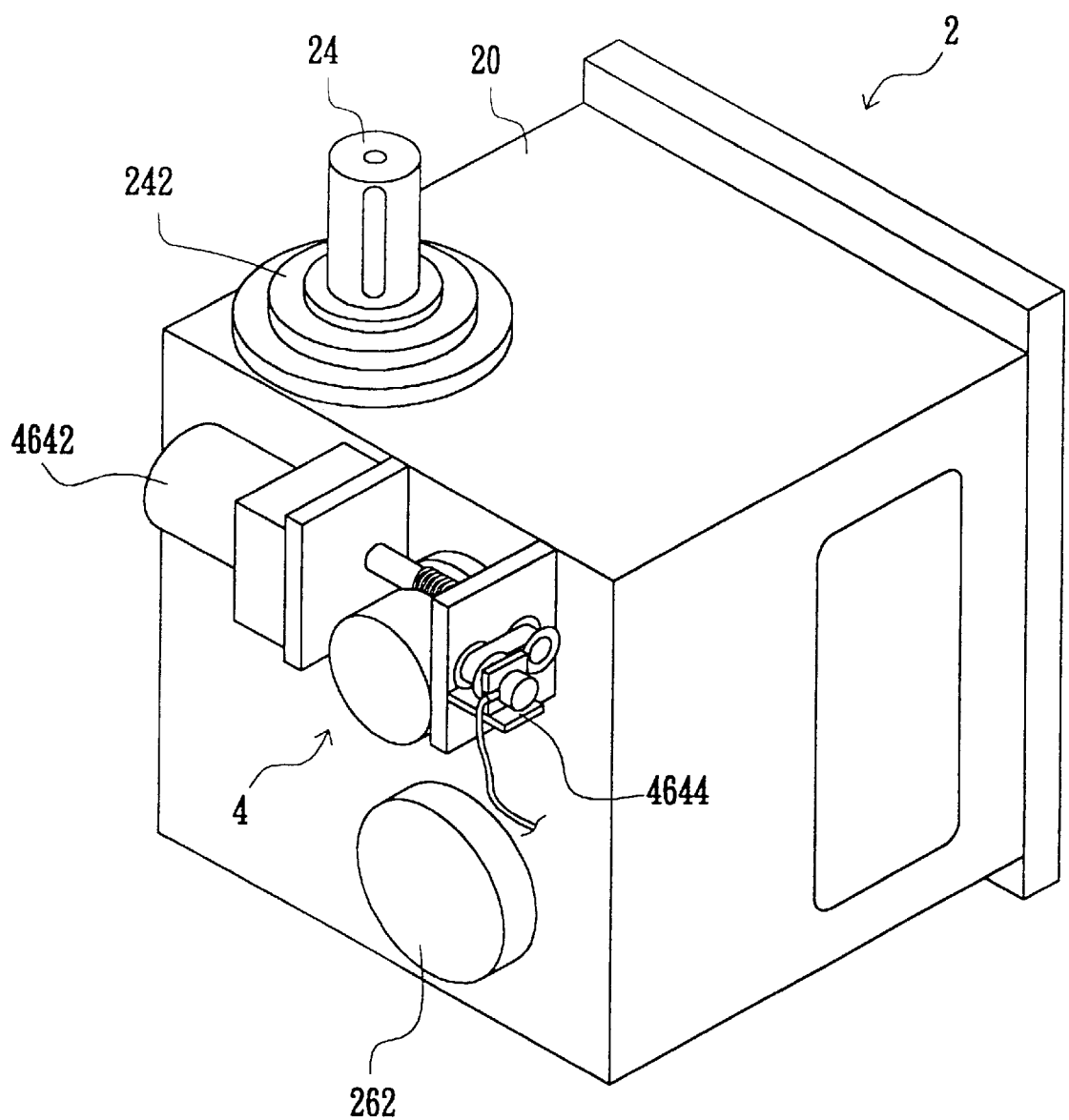
FIG. 4 is an elevational view of a second transmission gearbox according to the present invention.
Figure 5:
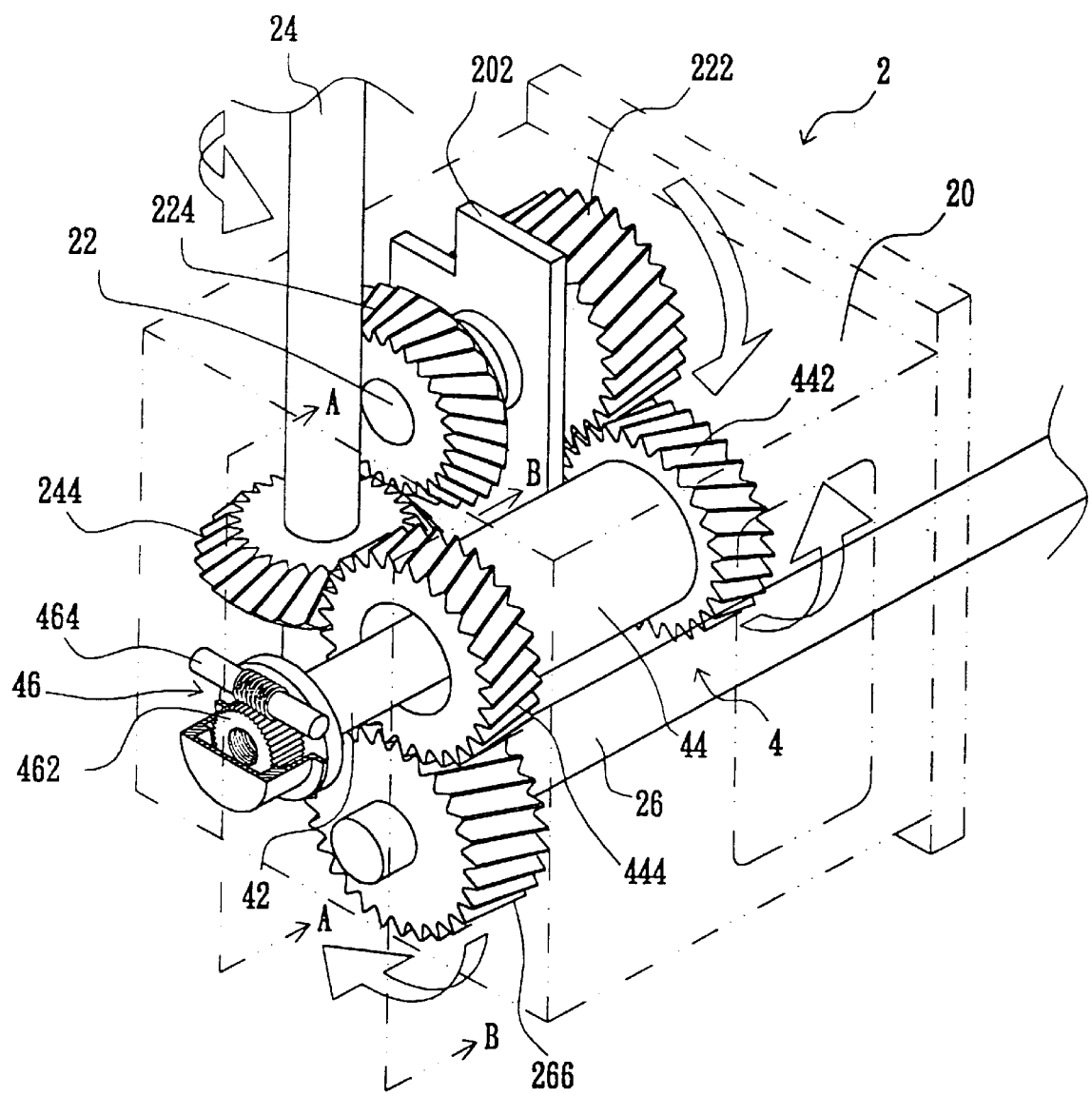
FIG. 5 illustrates the internal structure of the second transmission gearbox.
Figure 5A:
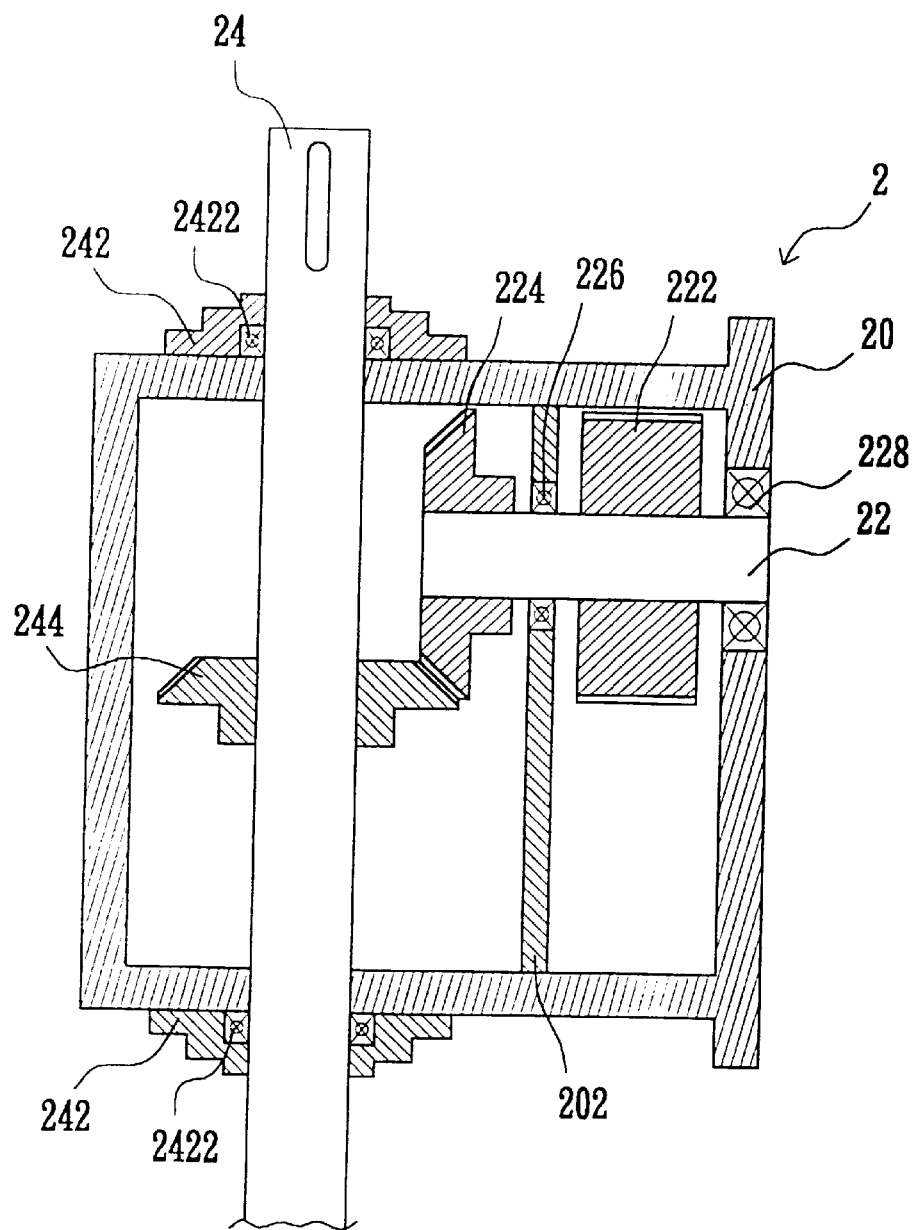
FIG. 5A is a sectional view taken along line A—A of FIG. 5.
Figure 5B:
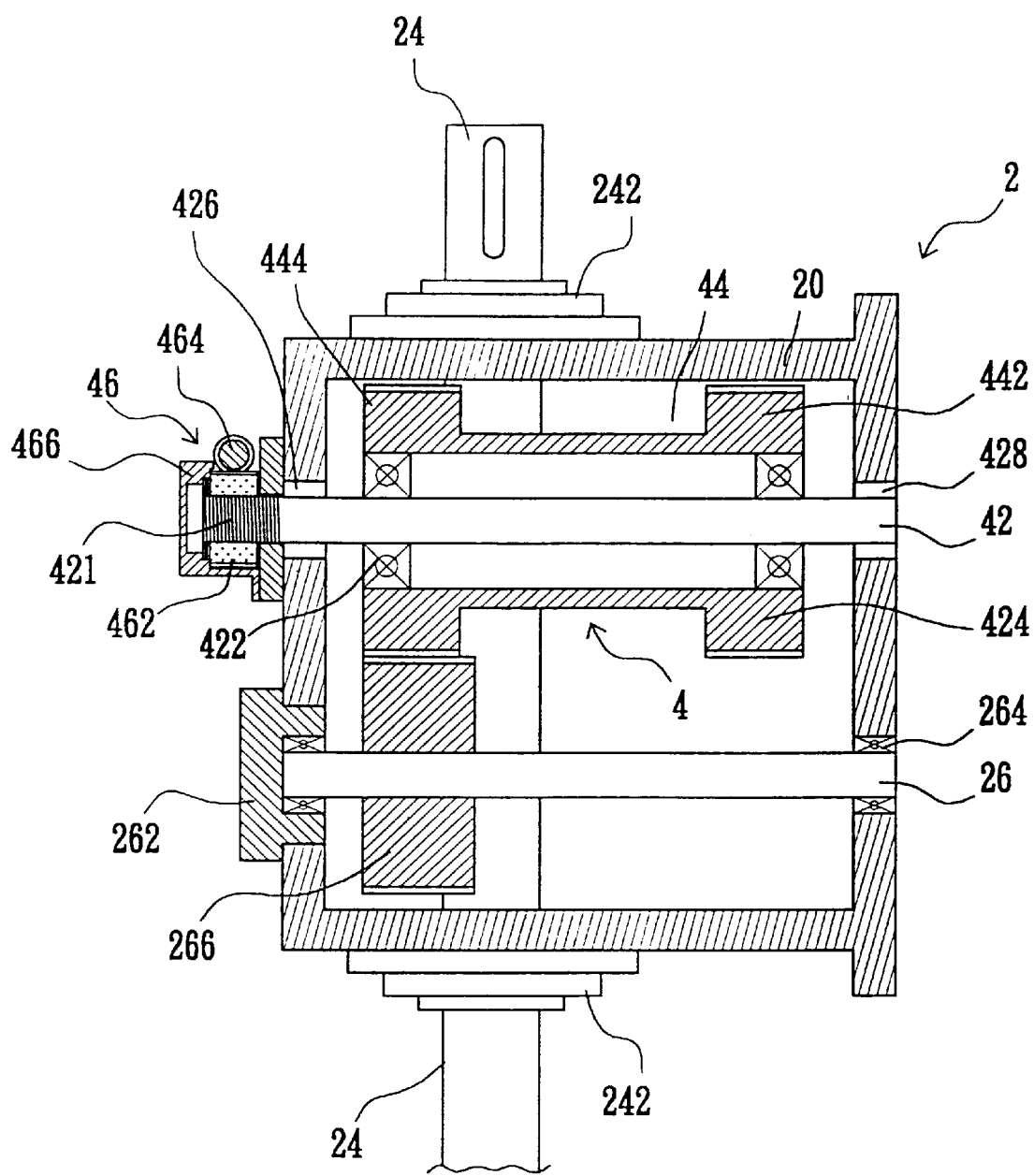
FIG. 5B is a sectional view taken along line B—B of FIG. 5.
Figure 6:
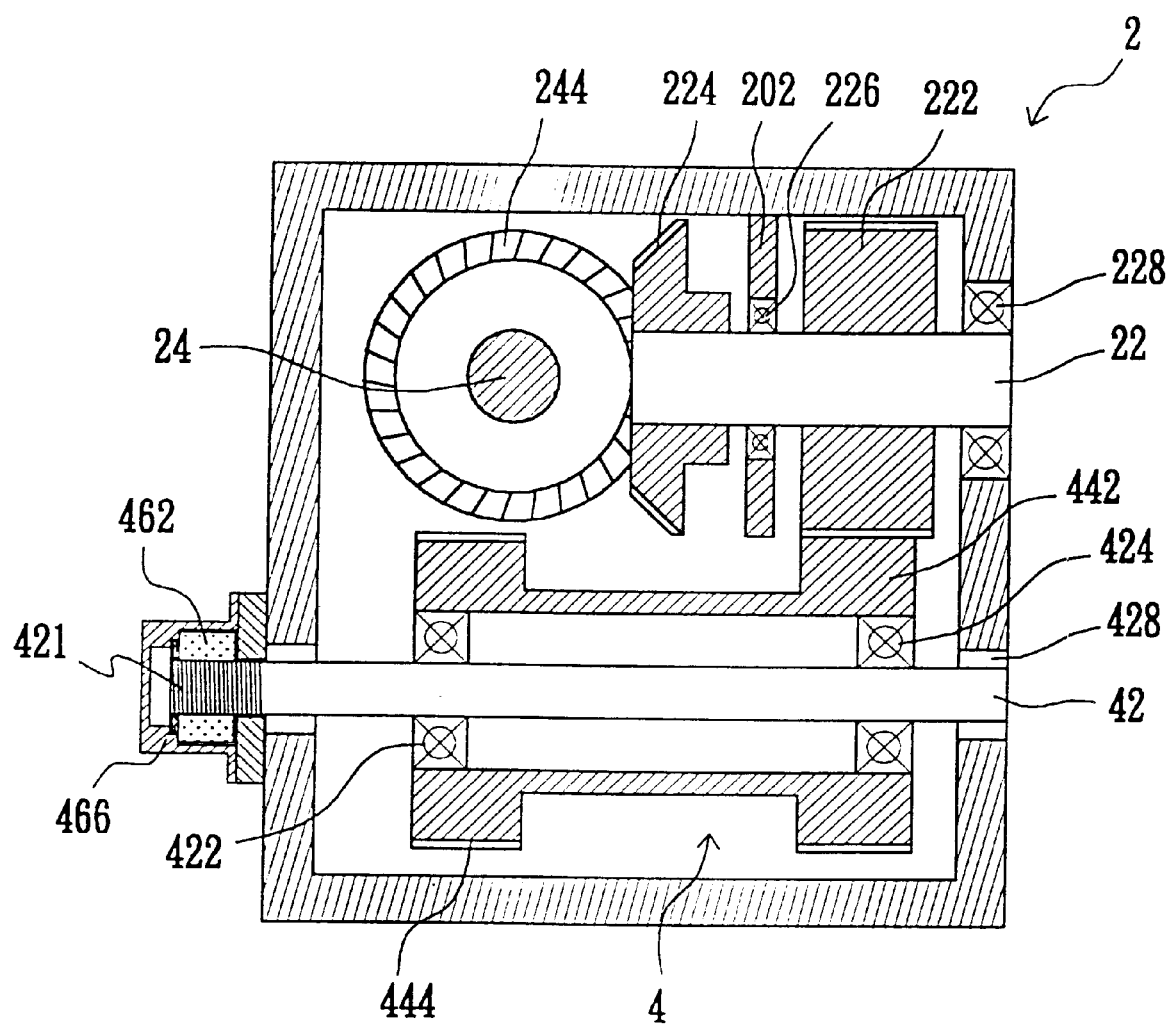
FIG. 6 is a top view in section of the second transmission gearbox according to the present invention.
Figure 7:
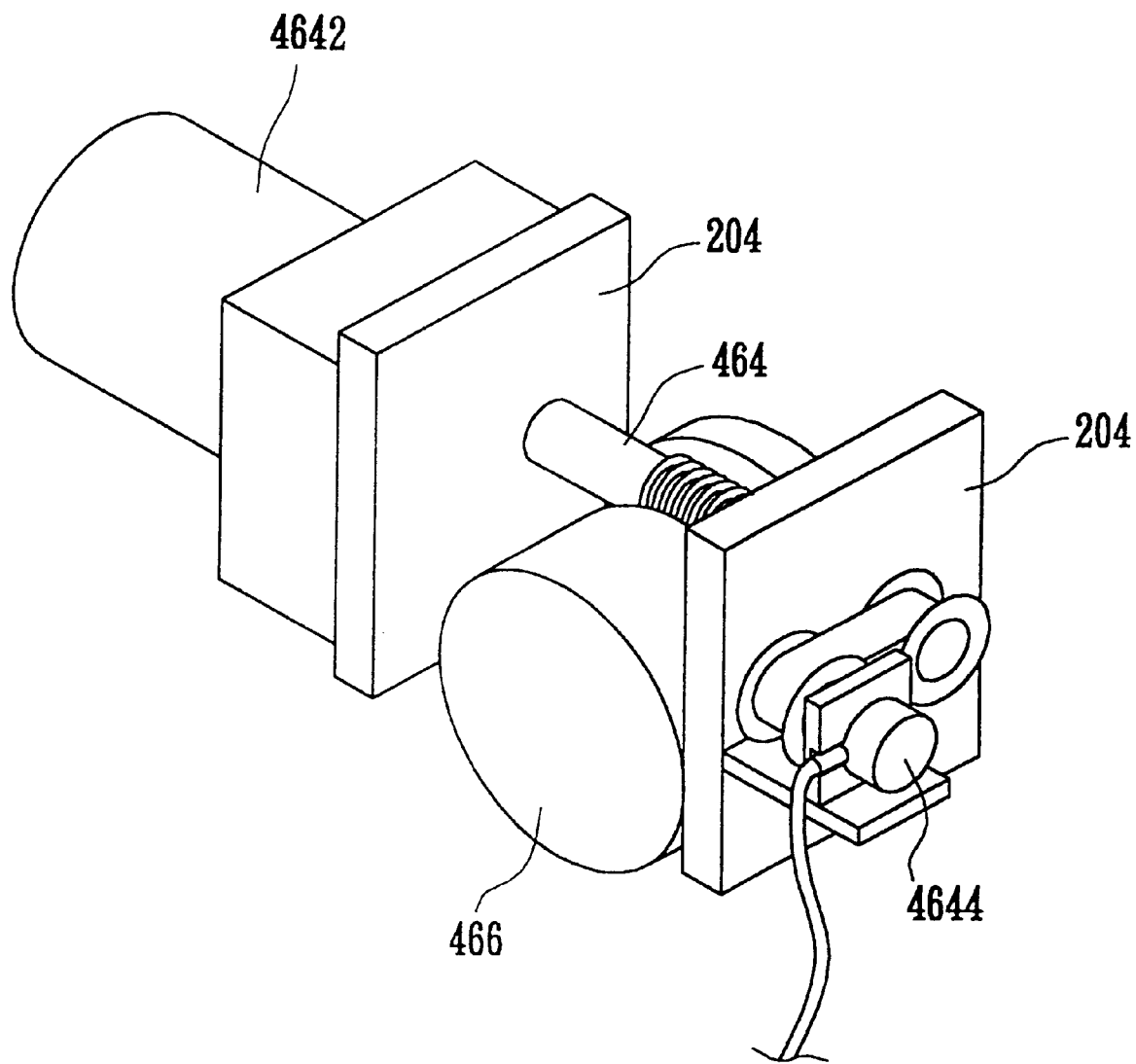
FIG. 7 is an elevational view of a worm and gear assembly according to the present invention.
Figure 7A:
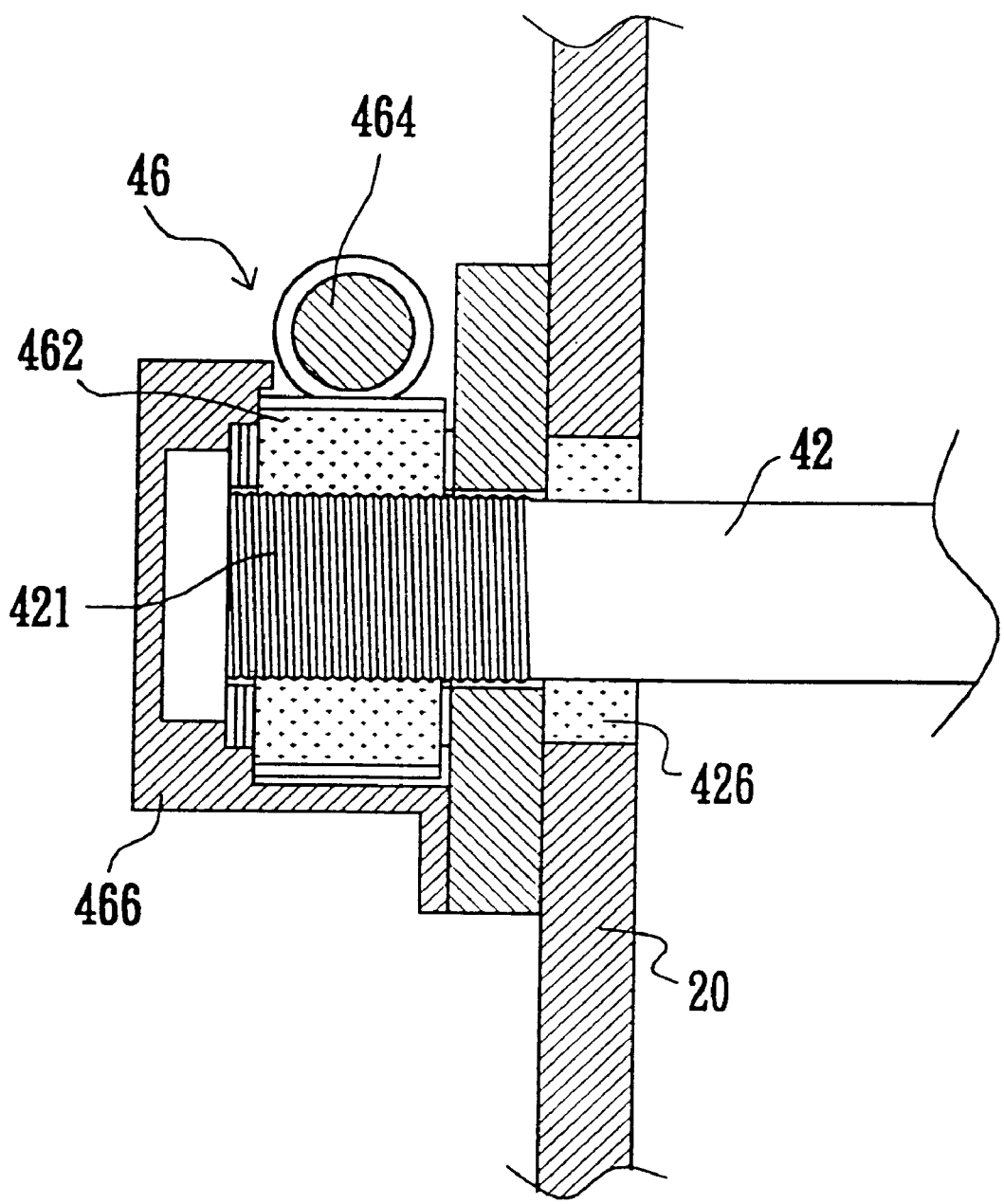
FIG. 7A is a sectional view of the worm and gear assembly of the present invention.
Figure 8:
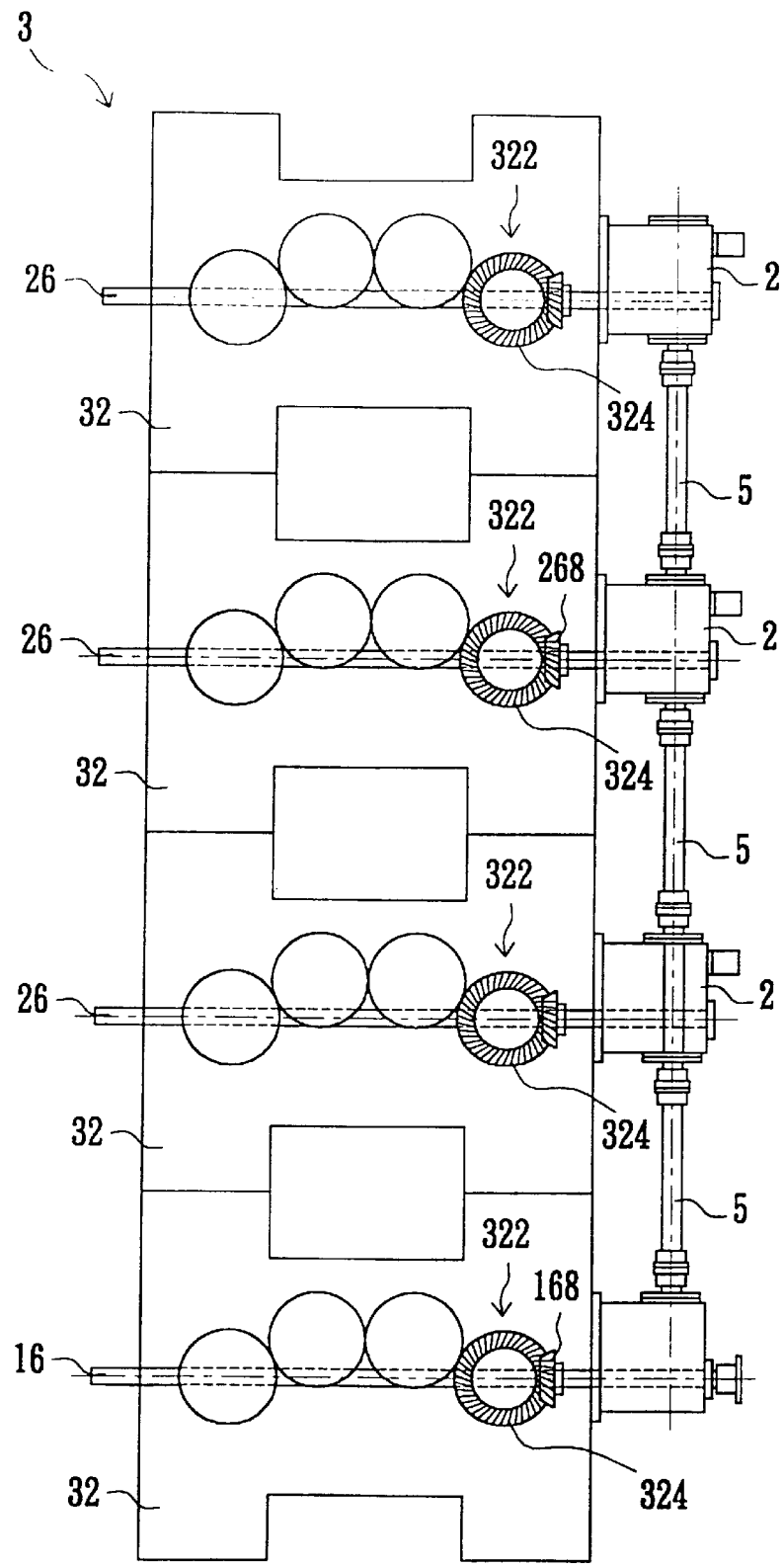
FIG. 8 is a front view of the present invention, showing the first transmission gearbox and second transmission gearboxes respectively coupled to the printing units.

Referring to FIGS. 1, 2, 2A, and 3, the first transmission gear box 1 comprises an enclosed shell 10, a power input shaft 12 transversely mounted in the shell 10, a fixed end cap 128 fixedly mounted in a hole (not shown) on one vertical side wall of the shell 10, a first axle bearing 1282 mounted within the end cap 128 and supporting one end of the power input shaft 12, a second axle bearing 126 mounted in one vertical side wall of the shell 10 opposite to the end cap 128 and supporting the other end of the power input shaft 12, a driven helical gear 122 and a driving bevel gear 124 fixedly mounted on the power input shaft 12 between the axle bearings 1282 and 126, a first axle holder 142 fixedly mounted on the horizontal top side wall of the shell 10, a power output shaft 14 vertically mounted in the axle holder 142, a third axle bearing 1422 mounted in the axle holder 142 and supporting the power output shaft 14, a driven bevel gear 144 fixedly mounted on one end, namely, the bottom end of the power output shaft 14 and meshed with the driving bevel gear 124, a transmission shaft 16 transversely mounted in the shell 10, a second axle holder 162 fixedly mounted one vertical side wall of the shell 10, a fourth axle bearing 164 mounted within the second axle holder 62 and supporting the transmission shaft 16, a driving helical gear 166 fixedly mounted on the transmission shaft 16 and meshed with the driven helical gear 122, and a transmission bevel gear 168 fixedly mounted on the transmission shaft 16 outside the shell 10 (see FIG. 8).

Referring to FIGS. 8 and 9, the first transmission gear box 1 is installed in the printing unit 32 at the first deck of the rotary printing press 3, and the transmission bevel gear 168 of the first transmission gear box 1 is meshed with an annular gear 324 at a plate cylinder 322 of the first printing unit 32. External rotary driving force is inputted into the transmission shaft 16, causing the transmission shaft 16 to rotate the power input shaft 12 and the power output shaft 14, and at the same time the transmission bevel gear 168 is turned with the transmission shaft 16 to rotate the plate cylinder 322 of the first printing unit 32.

Referring to FIGS. from 4 through 7, the second transmission gear box 2 comprises an enclosed shell 20, a bracket 202 fixedly provided inside the shell 20, a first axle bearing 228 mounted in a hole (not shown) on one vertical side wall of the shell 20, a second axle bearing 226 mounted in a hole (not shown) on the bracket 202 in alignment with the first axle bearing 228, a power output shaft 22 supported in the first axle bearing 228 and the second axle bearing 226, a driven bevel gear 224 and a driving helical gear 222 respectively and fixedly mounted on the power output shaft 22 and spaced from the bracket 202 at two opposite sides within the shell 20, two first axle holders 242 respectively fixedly provided at the horizontal top and bottom side walls of the shell 20, two third axle bearings 2422 respectively mounted in the first axle holders 242, a power input shaft 24 supported in the third axle bearings 2422, a driving bevel gear 244 fixedly mounted on the power input shaft 24 and meshed with the driven bevel gear 224, two axle bushings 426 and 428 respectively installed in two opposite vertical side walls of the shell 20, a second axle holder 262 mounted in a hole (not shown) on one vertical side wall of the shell 20, a fourth axle bearing 264 mounted in a hole (not shown) on one vertical side wall of the shell 20 opposite to the second axle holder 262, a transmission shaft 26 supported in the second axle holder 262 and the fourth axle bearing 264, a driven helical gear 266 fixedly mounted on the transmission shaft 26 and disposed inside the shell 20, a transmission bevel gear 268 fixedly mounted on the transmission shaft 26 and disposed outside the shell 20, and an adjustment mechanism 4 installed inside the shell 20. The adjustment mechanism 4 is comprised of a gear barrel 44, a locating axle 42, and a worm and gear assembly 46. The gear barrel 44 comprises a first transmission helical gear 442 and a second transmission helical gear 444 reversely disposed at two opposite ends thereof, and two axle bearings 422 and 424 respectively disposed inside the two opposite ends. The first transmission helical gear 442 is meshed with the driving helical gear 222. The second transmission helical gear 444 is meshed between the driving bevel gear 244 and the driven helical gear 266. The locating axle 42 is supported in the axle bearings 422 and 424 and the axle bushings 426 and 428 and disposed in parallel to the power output shaft 22, having a threaded end 421 disposed outside the shell 20. The worm and gear assembly 46 comprises a gear 462 suspended in a cap 466 outside the shell 20 and threaded onto the threaded end 421 of the locating axle 42, a worm 464 supported in two supporting boards 204 outside the shell 20 and meshed with the gear 462, a servomotor 4642 mounted on one support board 204 and coupled to one end the worm 464, and a counter 4644 mounted on the other supporting board 204 and coupled to the other end of the worm 464. The servomotor 4642 is controlled to rotate the worm 464. The counter 4644 counts the amount of rotary motion of the worm 464, and sends the data to a computer (not shown) for operation control.

Referring to FIGS. 8 and 9, the transmission bevel gear 268 on the transmission shaft 26 of each second transmission gear box 2 is meshed with the annular gear 324 at the plate cylinder 322 of one printing unit 32 of the rotary printing press 3 above the second deck. Further, a respective coupling shaft 5 is respectively coupled between the power output shaft 14 of the first transmission gear box 1 at the first deck of the rotary printing press 3 and the second transmission gear box 2 at the second deck of the rotary printing press 3, and the power input shafts 24 of each two adjacent second transmission gear boxes 2 for the transmission of rotary driving force. During the operation of the rotary printing press 3, rotary driving force is transmitted from the power output shaft 14 of the first transmission gear box 1 through the corresponding coupling shaft 5 to the power input shaft 24 of the second transmission gear box 2 at the second deck. Upon rotary motion of the power, the driving bevel gear 244 is driven to rotate the driving bevel gear 222 via the driven bevel gear 224, thereby causing the helical gear 442 to be rotated, and therefore the gear barrel 44 is rotated on the locating axle 42. Rotating the gear barrel 44 causes the helical gear 444 to rotate the transmission shaft 26 via the helical gear 266, and therefore the transmission bevel gear 268 is driven to rotate the plate cylinder 322 of the corresponding printing unit 32.

Through the aforesaid first transmission gear box 1, coupling shafts 5 and second transmission gear boxes 2, rotary driving force is precisely transmitted to every printing units 32, keeping the plate cylinder 322 of every printing unit 32 rotated at an equal speed.

When adjusting the position of the color plate of the plate cylinder 322 of one printing unit 3, the respective servomotor 4642 is controlled to rotate the worm 464, causing it to rotate the gear 462 in the cap 466 clockwise (or counter-clockwise), and therefore the locating axle 42 is moved axially forwards (or backwards), and at the same time the gear barrel 44 is moved axially with the locating axle 42. Because the helical gear 442 is constrained by the driving helical gear 222, axial movement of the gear barrel 44 causes the driven helical gear 266 to be rotated clockwise (or counter-clockwise) by the helical gear 444 of the gear barrel 44 through an angle, and therefore the transmission bevel gear 268 is rotated with the transmission shaft 26 to rotate the plate cylinder 322 of the corresponding printing unit 32 clockwise (or counter-clockwise) to the desired position. By means of the operation of the counter 4644 and the matched computer, the position adjustment is accurately achieved.

While only one embodiment of the present invention has been shown and described, it will be understood that various modifications and changes could be made thereunto without departing from the spirit and scope of the invention disclosed.

What the invention claimed is:

1. A single space rotary printing press for newspapers comprising a plurality of printing units vertically arranged at different elevations, said printing units each comprising a plate cylinder having an annular gear at one end, a first transmission gear box and at least one second transmission gear box respectively coupled to said printing units and driven to rotate said printing units, wherein:

said first transmission gear box comprises an enclosed shell, a power input shaft transversely mounted in the shell of said first transmission gear box, a driven helical gear and a driving bevel gear fixedly mounted on the power input shaft of said first transmission gear box, a power output shaft vertically mounted in the shell of said first transmission gear box, a driven bevel gear fixedly mounted on one end of the power output shaft of said first transmission gear box and meshed with the driving bevel gear of said first transmission gear box, a transmission shaft transversely mounted in the shell of said first transmission gear box, a driving helical gear fixedly mounted on the transmission shaft of said first transmission gear box and meshed with he driven helical gear of said first transmission gear box, and a transmission bevel gear fixedly mounted on the transmission shaft of said first transmission gear box meshed with the annular gear at the plate cylinder of the printing unit at the lowest elevation;

said at least one second transmission gear box each comprises an enclosed shell, a bracket fixedly provided inside the shell of the corresponding second transmission gear box, a power output shaft transversely mounted on said bracket, a driven bevel gear and a driving helical gear respectively and fixedly mounted on the power output shaft of the corresponding second transmission gear box and spaced from said bracket at two opposite sides, a vertically extended power input shaft, a driving bevel gear fixedly mounted on the power input shaft of the corresponding second transmission gear box and meshed with the driven bevel gear of the corresponding second transmission gear box, a transmission shaft arranged in parallel to the power output shaft of the corresponding second transmission gear box, a driven helical gear fixedly mounted on the transmission shaft of the corresponding second transmission gear box, a transmission bevel gear fixedly mounted on the transmission shaft of the corresponding second transmission gear box and meshed with the annular gear at the plate cylinder of one printing unit, and an adjustment mechanism installed in the shell of the corresponding second transmission gear box, said adjustment mechanism comprised of a locating axle, a gear barrel mounted on said locating axle and moved axially along said locating axle, and a worm and gear assembly, said gear barrel comprising a first transmission helical gear and a second transmission helical gear reversely disposed at two opposite ends thereof, said first transmission helical gear meshed with the driving helical gear on the power output shaft of the corresponding second transmission gear box, said second transmission helical gear meshed between the driving bevel gear at the power input shaft of the corresponding second transmission gear box and the driven helical gear at the transmission shaft of the corresponding second transmission gear box, said locating axle having a threaded end disposed outside the shell of the corresponding second transmission gear box, said worm and gear assembly comprising a worm gear threaded onto the threaded end of said locating axle, a worm supported in two supporting boards outside the shell of the corresponding second transmission gear box and meshed with said worm gear, and a servomotor mounted on one of said support boards and coupled to one end of said worm; and coupling means respectively coupled between the power output shaft of said first transmission gear box and the power input shaft of said at least one second transmission gear box for enabling said first transmission gear box and said at least one second transmission gear boxes to be synchronously rotated.

2. The single space rotary printing press for newspapers of claim 1 wherein said worm and gear assembly further comprises a counter mounted on one of said supporting boards opposite to said servomotor and coupled to said worm to count the amount of rotary motion of said worm and to provide the counting data to an external computer, which controls the operation of the single space rotary printing press for newspapers.

\* \* \* \* \*